G. FRANK.
EARTH AUGER.
APPLICATION FILED OCT. 8, 1915.
1,173,500.
Patented Feb. 29, 1916.
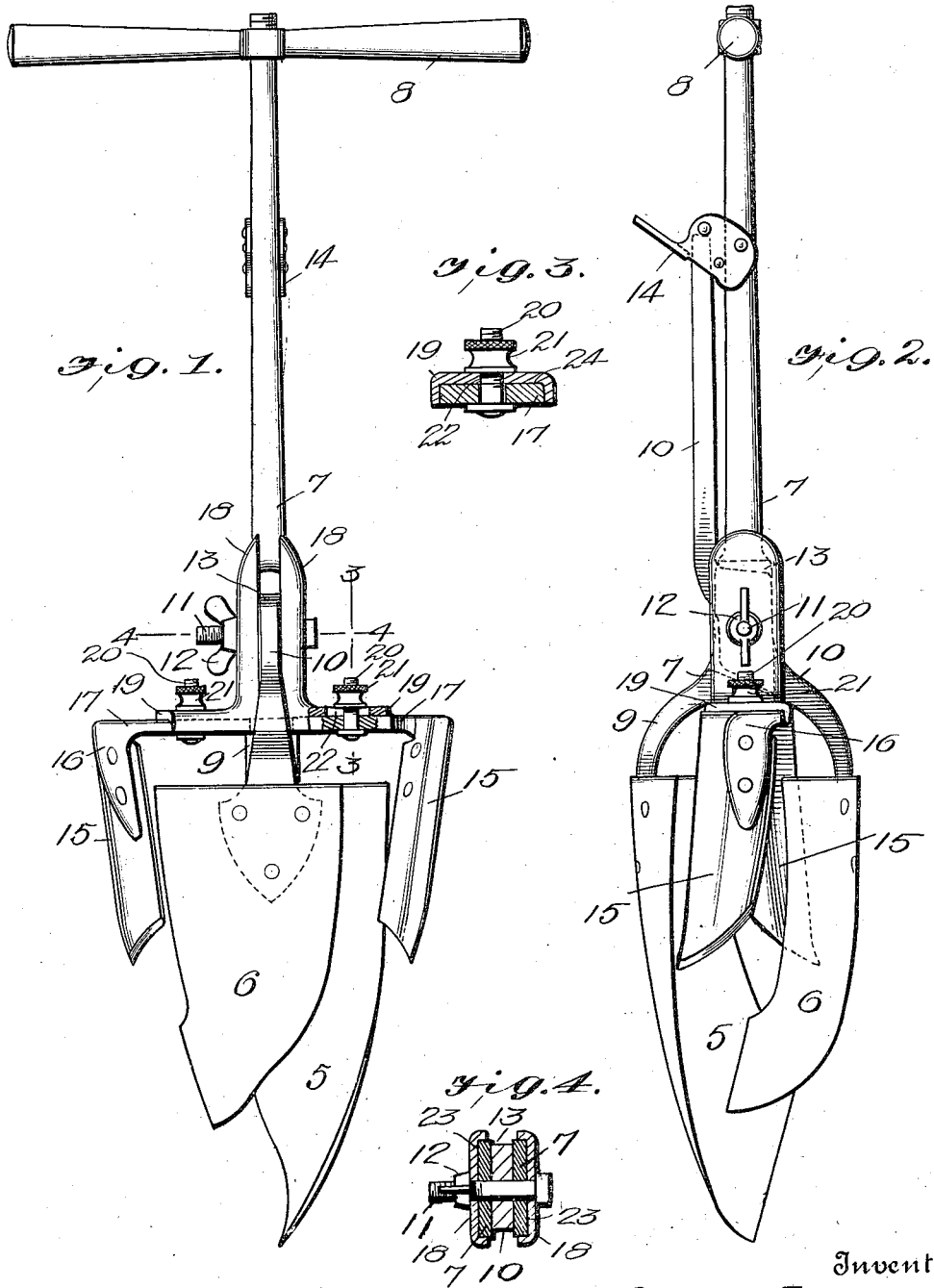
Inventor
GEORGE FRANK
By Milo B. Stimmel & Co.
Attorneys

UNITED STATES PATENT OFFICE.

GEORGE FRANK, OF TITONKA, IOWA.

EARTH-AUGER.

1,173,500.  Specification of Letters Patent.  Patented Feb. 29, 1916.

Application filed October 8, 1915. Serial No. 54,852.

*To all whom it may concern:*

Be it known that I, GEORGE FRANK, a citizen of the United States, residing at Titonka, in the county of Kossuth and State of Iowa, have invented certain new and useful Improvements in Earth-Augers, of which the following is a specification.

This invention relates to tools for making holes in the ground, the tool operating similar to an auger, and the invention has for its object to provide a novel arrangement of auxiliary blades which enables the tool to bore holes greater in diameter than the holes which can be made in the ordinary operation of the tool.

The object stated is attained by means of a novel combination and arrangement of parts to be hereinafter described and claimed, and in order that the same may be better understood, reference is had to the accompanying drawing, in which—

Figure 1 is a side elevation of the tool, partly in section; Fig. 2 is a side elevation at a right angle to Fig. 1, and Figs. 3 and 4 are sectional details on the lines 3—3 and 4—4, respectively, of Fig. 1.

Referring specifically to the drawing, 5 and 6 denote the two main blades of the auger, the same being arranged opposite each other and shaped as usual so that they may be forced into the ground by a rotary motion similar to an auger. The blade 5 is carried by a shank 7 provided with a suitable operating handle 8 at its upper end, and the lower end of the shank has an offset or lateral bend 9 to which the blade 5 is secured in any approved manner. The blade 6 is carried by a shank 10 which crosses and is pivotally connected to the shank 7 by a bolt 11 secured by a wing nut 12. The shank 7, above the offset 9, has a slot 13 through which the shank 10 passes. By providing a pivotal connection between the shanks 7 and 10, the blade 6 may be swung away from the blade 5 to release the dirt.

In order to hold the blade 6 stationary when the tool is in operation, there is mounted on the shank 7 a latch 14 which is engageable with the shank 10, and upon disengaging said latch, the blade 6 is released and free to swing outward of the blade 5 for the purpose stated. Associated with the main blades 5 and 6 are auxiliary blades 15 designed to be used when it is desired to make a hole having a diameter greater than the diameter of the hole which can be made by the main blades. Two of these auxiliary blades are provided and they are diametrically opposite each other and positioned adjacent to the cutting edges of the respective main blades. Each auxiliary blade is attached to a shank which consists of two adjustably connected sections arranged to permit the blade to be set different distances outward of the main blades 5 and 6. The shank section to which the auxiliary blade is secured is indicated at 16, and said section has a top lateral extension or arm 17. The other shank section is indicated at 18 and is mounted on the side of the shank 7, and has at the bottom a lateral extension or arm 19. The extensions 17 and 19 lap and are adjustably connected by a bolt 20 secured by a nut 21. In the extension 19 is a longitudinal slot 22 to receive the bolt 20, which provides an adjustable connection between the shank sections. Upon loosening the nut 21, the part 17 may be slid outward to vary the position of the auxiliary blade with respect to the main blades. The auxiliary blade may thus be positioned to work outside the circle described by the main blades, thereby obtaining a hole having a diameter which is greater than the diameter of the hole which can be made with the main blades. The adjustable attaching means herein described is the same for both auxiliary blades, and said blades may be removed when not needed.

The shank section 18 is secured to the shank 7 by the bolt 11, and said section has a groove 23 in its inner face in which the side of the shank 7 seats, which assists to hold the shank section firmly in place. The part 19 has a bottom groove 24 in which the part 17 seats, whereby lateral play of the latter is prevented and the same is securely fastened to the part 19 when the nut 21 is tightened up.

I claim:—

1. An earth auger, comprising main blades, a shank carrying one of the blades, to which shank the other blade is pivotally connected, an auxiliary blade adjustable to work outside the circle described by the main blades, and a shank carrying the auxiliary blade, said shank comprising adjustably connected sections, one of said sections being connected to the aforesaid main blade shank and the other section carrying the auxiliary blade.

2. An earth auger comprising main blades, a shank carrying one of the blades, to which shank the other blade is pivotally connected, an auxiliary blade adjustable to work outside the circle described by the main blades, a shank carrying the auxiliary blade, said shank comprising a section which is secured to the aforesaid main blade shank and has a lateral bottom extension, the other shank section carrying the auxiliary blade and having a lateral top extension lapping the first-mentioned extension, and securing means passing through the lapping extensions, one of said extensions having a longitudinal slot through which the securing means passes.

In testimony whereof I affix my signature in presence of two witnesses.

GEORGE FRANK.

Witnesses:
 WM. BOYKEN,
 J. J. COSGROVE.